(12) United States Patent
Van Herpen (10) Patent No.: US 8,388,184 B2
(45) Date of Patent: Mar. 5, 2013

(54) LIGHT EMITTING TUFTED CARPET

(75) Inventor: Maarten Marinus Johannes Wilhelmus Van Herpen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 74 days.

(21) Appl. No.: 12/743,848

(22) PCT Filed: Nov. 17, 2008

(86) PCT No.: PCT/IB2008/054803
§ 371 (c)(1),
(2), (4) Date: May 20, 2010

(87) PCT Pub. No.: WO2009/066224
PCT Pub. Date: May 28, 2009

(65) Prior Publication Data
US 2010/0254141 A1    Oct. 7, 2010

(30) Foreign Application Priority Data

Nov. 23, 2007 (EP) .................................... 07121400
Mar. 4, 2008 (EP) .................................... 08152239
Jul. 30, 2008 (EP) .................................... 08161405

(51) Int. Cl.
  F21S 4/00        (2006.01)
  F21S 8/00        (2006.01)
  F21V 21/00       (2006.01)
  H01R 33/00       (2006.01)
  H02G 3/18        (2006.01)

(52) U.S. Cl. .................. 362/249.14; 362/153; 362/652; 174/482

(58) Field of Classification Search ................... 362/153, 362/249.14, 652; 174/482–490
See application file for complete search history.

(56) References Cited

U.S. PATENT DOCUMENTS 4,234,907 A    11/1980 Daniel
4,728,300 A *  3/1988 Shillito et al. ................ 439/426
(Continued)

FOREIGN PATENT DOCUMENTS

DE    4228570 A1    3/1994
DE    29825103 U1   10/2004
(Continued)

OTHER PUBLICATIONS

CRC Handbook of Chemistry and Physics, 69th Edition (1988-1989), Robert C. Weast, Editor in Chief, CRC Press, Inc., pp. E-208, E-406.

Primary Examiner — David J Makiya (57) ABSTRACT

The invention provides a light emitting tufted carpet (1). The carpet (1) comprises a primary backing layer (100), an optional secondary backing layer (200), an optional adhesive layer (300), a plurality of carpet integrated LEDs (40) arranged to generate carpet light (41), and a first electric conductor (10) and a second electric conductor (20). The first electric conductor (10) and the second electric conductor (20) are arranged to provide power from a power source (50) to the LEDs (40). The primary backing layer (100) comprises a first felt layer (30'), or the optional secondary backing layer (200) comprises second felt layer (30"), or both the primary backing layer (100) and the optional secondary backing layer (200) comprise felt layers (30',30"). One or more of the first electric conductor (10) and the second electric conductor (20) are at least partially integrated in one or more of the first felt layer (30') and the second felt layer (30").

19 Claims, 7 Drawing Sheets

U.S. PATENT DOCUMENTS

| | | | |
|---|---|---|---|
| 4,737,764 A | 4/1988 | Harrison | |
| 4,761,047 A | 8/1988 | Mori | |
| 4,794,373 A * | 12/1988 | Harrison | 340/286.01 |
| 5,107,408 A * | 4/1992 | Vernondier | 362/238 |
| 6,203,636 B1 | 3/2001 | Popper et al. | |
| 6,481,877 B1 | 11/2002 | Bello, Jr. | |
| 6,736,442 B2 * | 5/2004 | Gebreselassie et al. | 296/97.23 |
| 7,670,022 B2 * | 3/2010 | Kessler et al. | 362/153 |
| 2003/0072911 A1 * | 4/2003 | Higgins et al. | 428/95 |
| 2004/0022994 A1 * | 2/2004 | Higgins et al. | 428/95 |
| 2006/0082987 A1 | 4/2006 | Dorsey et al. | |
| 2007/0037462 A1 | 2/2007 | Allen et al. | |

FOREIGN PATENT DOCUMENTS

| | | |
|---|---|---|
| DE | 202006015357 U1 | 1/2007 |
| DE | 102005036533 A1 | 2/2007 |
| DE | 102006012606 A1 | 11/2007 |
| EP | 0155157 A2 | 9/1985 |
| EP | 0261811 A2 | 3/1988 |
| EP | 0323682 A1 | 7/1989 |
| EP | 1193340 A2 | 4/2002 |
| EP | 1306477 A1 | 5/2003 |
| FR | 2592963 A1 | 7/1987 |
| GB | 1336030 A | 11/1973 |
| JP | 1079702 A | 3/1989 |
| JP | 08288053 A | 11/1996 |
| JP | 2003210308 A | 7/2003 |
| KR | 2002086396 A | 11/2002 |
| WO | 2006057531 A1 | 6/2006 |
| WO | 2006098799 A2 | 9/2006 |
| WO | 2006129272 A2 | 12/2006 |
| WO | 2007033980 A2 | 3/2007 |
| WO | 2009066215 A1 | 5/2009 |
| WO | 2009066216 A1 | 5/2009 |
| WO | 2009066228 A1 | 5/2009 |
| WO | WO 2009066226 A1 | 5/2009 |

* cited by examiner

LIGHT EMITTING TUFTED CARPET

FIELD OF THE INVENTION

The present invention relates to textile materials having also a light emitting function. The invention especially relates to a carpet comprising a primary backing layer, yarns forming tufts on a carpet side of the primary backing layer, a secondary backing layer, and an adhesive layer arranged between the primary and secondary backing layers.

BACKGROUND OF THE INVENTION

Carpets generally comprise a primary backing layer provided with yarns forming tufts (on its side facing the user during its use as carpet), a secondary backing layer, and in general an adhesive layer provided between the primary backing layer and the secondary backing layer. The yarns penetrate the primary backing layer to form tufts projecting from the pile surface on which people can walk, etc. The yarns are normally loose and need to be adhered with adhesive (from an adhesive layer). The adhesive layer which may be present on the backside of the primary backing adheres the tufts to the primary backing layer and holds the tufts in place, as well as adhering the primary backing layer and the secondary backing layer. The latter may also be achieved with a second adhesive layer on top of the first adhesive layer.

Textiles comprising optical fibres are known in the art. US2007/0037462 for instance describes a method for manufacturing a distributed optical fibres scrim comprising functional optical fibres, the functional optical fibres scrim thus manufactured, and composites in which an optical fibres scrim is incorporated. This document describes a variety of textile scrims, particularly adhesively bonded non-woven scrim materials, each comprising at least one optical fibre with a continuous path across at least the length or width of the fabric. Such optical fibres scrims may be useful as sensor components (for example, as a detector of breakage, strain, pressure, or torque), as illumination components (for example, in a variety of light-providing applications), or as data-distribution components, either alone or in combination with other materials, such as fabrics, films, foams, and the like.

The use of electronic components in for instance carpets is known in the art. WO2007033980 for instance describes such carpet, as well as a method for equipping a carpet with electronic components. In order to create a method which ensures that the electronic components can be applied to the carpet in an efficient and accurately locatable manner, the electronic components that are fixedly joined to a support material are glued to the carpet with the aid of the supports.

SUMMARY OF THE INVENTION

A disadvantage of prior art may be that when embedding LEDs in carpet the protection of the LEDs and/or other electronic components against wear from traffic walking over the carpet, or other (pressure) influences, may be difficult. Further, it is a challenge to provide electrical power in an energy efficient way, and in a way that allows the installer to cut the carpet at any length. Further, the heat generated by the LEDs, especially when using high power LEDs, may be a problem.

Hence, it is an aspect of the invention to provide an alternative carpet, which preferably further at least partially obviates one or more of above-described drawbacks.

Therefore, the invention provides in an embodiment a light emitting tufted carpet (herein further also indicated as carpet) comprising
a. a primary backing layer, an optional secondary backing layer, wherein the primary backing layer comprises a first felt layer, or the optional secondary backing layer comprises a second felt layer, or wherein both the primary backing layer and the optional secondary backing layer comprise felt layers,
b. a plurality of carpet integrated LEDs arranged to generate carpet light,
c. a first electric conductor and a second electric conductor, wherein the first electric conductor and the second electric conductor are arranged to provide power from a power source to the LEDs, and wherein one or more of the first electric conductor and the second electric conductor are at least partially integrated in one or more of the first felt layer and the second felt layer.

An advantage of such carpet is that the LEDs may be protected by the carpet, i.e. not directly exposed to objects, humans or animals positioned or moving on the carpet. Since the LEDs are within the carpet, and not directly exposed, the term "carpet integrated LEDs" is used. A further advantage may be that the electric conductors may at least partly be protected by the carpet. Yet a further advantage may be that the carpet may be cut at the desired length, without detrimentally disconnecting the LED from the power source. This may especially apply when each LED has its own power distribution and/or when the LEDs are electrically connected parallel and/or when the plurality of LED consists of two or more subsets of one or more LEDs, which two or more subsets are individually electrically connected to the power source. An advantage of using felt is that it may relatively easily be used to include recess for LEDs therein (see below) and/or that it may be used as electric conductor (see also below).

Note that the terms first and second, and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The phrase "wherein the primary backing layer comprises a first felt layer", and similar phrases indicates that the first felt layer may be part of the primary backing layer but in another embodiment indicates that the primary backing layer essentially consists of the first felt layer. Therefore, in a specific embodiment, the primary backing layer is the first felt layer. Likewise, this may apply to the secondary backing layer and the second felt layer: thus, the second felt layer may be part of the secondary backing layer but in another embodiment indicates that the secondary backing layer essentially consists of the second felt layer. Therefore, in a specific embodiment, the secondary backing layer is the second felt layer.

For dimensional strength reasons, in general the carpet of the invention will comprise a secondary backing layer. Hence, in an embodiment the carpet comprises the secondary backing layer. In another preferred embodiment, the secondary backing layer is the second felt layer and optionally the primary backing layer may comprise the first felt layer. In yet a further embodiment, the primary backing layer is the first felt layer and the secondary backing layer is the second felt layer.

In a further embodiment, the carpet further comprises an adhesive layer arranged between at least part of the primary backing layer and the secondary backing layer. Such layer may be used to adhere the primary backing layer to the secondary backing layer (see also below). In a preferred embodiment, the adhesive layer is permeable to carpet light, and preferably the LEDs are arranged in one or more of the adhesive layer and the secondary backing layer (especially in recesses in one or more of these layers). When the adhesive layer is permeable to the carpet light, the light of the LEDs may more easily travel to the carpet top face or carpet surface.

As mentioned above, preferably one or more LEDs may be arranged in a layer recess of a layer selected from the group consisting of the primary backing layer, the optional secondary backing layer, and the optional adhesive layer as described above. Hence, the recess may be arranged in the primary backing layer, in the optional secondary backing layer, and when the optional secondary backing layer is present, also in the optional adhesive layer. In general, the LEDs will be attached to one of these layers. The LED(s) may thus be arranged in recesses in the layer to which the LEDs are attached, but the recesses may also be arranged in an layer adjacent from the layer to which the LED(s) are attached. The phrase "one or more LEDs may be arranged in a layer recess of a layer selected from the group consisting of the primary backing layer, the optional secondary backing layer, and the optional adhesive layer" indicates that at least part of the total number of the plurality of LEDs is arranged in the indicated layer(s). In/on other layers, optionally also LEDs may be arranged in recesses in the layers, and/or elsewhere on the layers.

The felt layer may be a needle felt layer. The term "felt" is known in the art and relates in general to a non-woven cloth that is produced by matting, condensing and pressing fibers. Felting is in general done by a chemical process, known in the art. It is also done with special felting needles, which grab individual fibers and drag them against their neighbours, thereby binding them. Such product is called a needle felt.

The term "felt layer" may in an embodiment also relate to a plurality of felt layers. In a specific embodiment, one or more of the first felt layer and the second felt layer comprise a felt layer stack (or felt layer laminate). Hence, the first felt layer may be a felt layer stack and/or the second felt layer may be felt layer stack. The term "felt layer stack" relates to a stack or laminate of felt layers (the laminate may also be made by needling the layers together).

Especially to protect the conductors, the conductors may be arranged within at least part of one or both felt layers. Therefore, in an embodiment, at least part of one or more of the first electric conductor and the second electric conductor are arranged in a plane parallel to a primary backing layer top surface in the first felt layer or the second felt layer. Hence, at least part of one of these conductors or both may be arranged in a plane parallel. Also at least part of one may be arranged in a plane parallel, and at least part of the other may be arranged in a plane perpendicular to the carpet. In this later option, the conductor may for instance protrude from the carpet at the carpet back side. Assuming the presence of the secondary backing layer, and thus optionally also the second felt layer, further, at least part of one of these conductors or both conductors may be arranged in the first felt layer, or may be arranged in the second felt layer, or one may be arranged in the first felt layer and one may be arranged in the second felt layer. Hence, the choice of the specific arrangement of the first and the second conductor may be made independently of the other.

In a specific embodiment, the one or more of the first electric conductor and the second electric conductor are selected from the group consisting of an electrical wire, an electrical conductive felt and an electrical conductive felt strip. Hence, the first conductor may be selected from one of these three options, but without regard to the first selection, the second conductor may also be selected from these three options. In a preferred embodiment, the types of first and second electrical conductor are the same, such as both electrical conductors being conductive felts. Thus, the choice of the specific arrangement of the first and the second conductor may be made independently of the other. Combinations with other embodiments are thus possible, such as the first conductor being a electrical wire and the second conductor being an electrical conductive felt strip.

The term "electric conductor" (herein also indicated as "conductor") may also relate to a plurality of conductors. In principle, each LED may be provided with power (i.e. electric power) by its "own" conductors. Further, a first and a second conductor may provide power to a subset of LEDs. When a plurality of sets of first and second electric conductors is applied, each individual conductor may be selected from the group consisting of an electrical wire, an electrical conductive felt and an electrical conductive felt strip. Again, in general, the first and second conductor in each individual set, and more preferably, all first and second conductors are of the same type.

The first electric conductor and the second electric conductor are herein together also indicated as set of electric conductors. A single set, or a plurality of sets may also be indicated as conductor arrangement.

As mentioned above, one or more of the first electric conductor and the second electric conductor may comprise an electrical wire. Further, one or more of the first electric conductor and the second electric conductor may comprise an electrical conductive felt. An advantage of using electrical conductive felts may be the fact that in embodiments the LEDs may be arranged anywhere. Further, cutting the carpet to the desired size may be easier, since in embodiments, this will not result in disconnection of the LEDs from the power source.

In a specific embodiment, the carpet comprises the secondary backing layer, wherein the first felt layer is the first electric conductor and wherein the second felt layer is the second electric conductor. In such embodiments, LEDs may be arranged everywhere in the carpet, since a first contact of each LED may be in electric contact with one of the electric conductors and a second contact of each LED may be in electric contact with the other electric conductor. The adhesive layer may be used as isolator or electrical non-conductive material, isolating the first conductor from the second conductor.

However, advantageously, one or more of the first felt layer and the second felt layer may comprise an electric conductive felt layer stack (also indicated as "felt layer stack") comprising a first electric conductive felt stack layer as first electric conductor and a second electric conductive felt stack layer as second electric conductor with an isolator arranged between the first electric conductive felt stack layer and the second electric conductive felt stack layer. Such electric conductive felt layer stack may be used as unit to serve a plurality of LEDs. The "electric conductive felt layer stack" is herein also indicated as "conductive felt layer stack". An electric conductive felt layer stack comprised by the first felt layer is indicated as first electric conductive felt layer stack; an electric conductive felt layer stack comprised by the second felt layer is indicated as second electric conductive felt layer stack. The term "serve" here indicates "providing/guiding electric power to". An advantage of using electrical conductive felt layer stacks may be the fact that in embodiments the LEDs may be arranged anywhere and thus cutting becomes even more easy.

The phrase "wherein the first felt layer comprises an electric conductive felt layer stack", and similar phrases indicates that the conductive felt layer stack may be part of the first felt layer but in another embodiment indicates that the first felt layer essentially consists of the conductive felt layer stack. Therefore, in a specific embodiment, the first felt layer is the electric conductive felt layer stack. Likewise this may apply to the second felt layer and an electric conductive felt layer stack.

As mentioned above, preferably the secondary backing is present. Further, as mentioned above, the primary backing layer comprises the first felt layer or the secondary backing layer comprises the second felt layer, or the primary backing layer comprises the first felt layer and the secondary backing layer comprises the second felt layer, or only the secondary backing layer comprises the second felt layer.

Preferably at least the second electric conductive felt layer stack is present, and optionally also the first electric conductive felt layer stack. Therefore, preferably the carpet comprises a secondary backing layer, wherein the secondary backing layer comprises the second electric conductive felt layer stack and optionally the primary backing layer also comprise the first electric conductive felt layer stack.

In another preferred embodiment, the secondary backing layer is the second electric conductive felt layer stack and optionally the primary backing layer may comprise the first electric conductive felt layer stack. In yet a further embodiment, the primary backing layer is the first electric conductive felt layer stack and the secondary backing layer is the second electric conductive felt layer stack.

Assuming the presence of the secondary backing layer, and assuming the presence of both electric conductive felt layer stacks, the felt layer stack comprised by the primary backing may a serve a subset of LEDs and the felt layer stack comprised by the secondary backing may a serve another subset of LEDs.

Further the term "electric conductive felt layer stack" may also relate to a plurality of (adjacent) electric conductive felt layer stacks, wherein the electric conductive felt layer stack may serve subsets of the plurality of LEDs, respectively.

Further, in an embodiment one or more of the first electric conductor and the second electric conductor may comprise an electrical conductive felt strip. This allows the use of a first felt layer and/or a second felt layer, of which only parts (strips) are electric conductive. In an embodiment, such electrical conductive felt strips may also comprise electrical conductive felt layer stacks (a combination with the above described embodiment).

The power source may be arranged external from the carpet. However, the power source may also be implemented in the carpet. Each LED may possess its (implemented) own power source, but one or more power sources may also be arranged to provide power to one or LEDs (subsets of LEDs). The term "power source" may thus also relate to a plurality of power sources. The term "implemented" herein may indicate that the power source is integrated in the carpet, such as in the secondary backing layer. However, the term "implemented" herein may also indicate that the power source is attached to the carpet, such as laminated to the bottom layer of the carpet.

The invention is related to carpets with the power source implemented, as well to combinations of carpets with the power source, wherein the power source is external from the carpets, as well to carpets without power sources, but which are arranged to be electrical connectable to an external power source to receive electric power from the external power source when connected and to provide carpet light when switched on.

The light emitting carpet may further comprise a controller, which may be implemented in the carpet or may be external from the carpet, wherein the controller is arranged to individually control the optical properties of the carpet light, or more preferably of two or more subsets of LEDs of the plurality of LEDs. The term optical properties may especially relate to intensity and colour. When different (subsets of) LEDs can be addressed by the controller, and the different (subsets of) LEDs have different colours, the colour of the carpet light as optical property may easily be controlled. For instance, two or more subsets may be arranged to provide light having a colour selected from the non-limiting group consisting of blue, green, yellow, red and white.

Further, the one or more of the first felt layer and the second felt layer may be heat conductive. This may improve transfer from heat from the LEDs and may thereby protect the carpet.

The term carpet herein refers to tufted carpets, but in an embodiment also to tufted rugs and in another embodiment also to tufted goblins. In yet another embodiment, the term carpet refers to tufted car mats. Examples are also tufted carpets that are used as wall or roof covering, or tufted bath mats. Herein, the light emitting tufted carpet is further also indicated as "carpet" or "tufted carpet".

The term "light emitting tufted carpet" refers to carpets according to the invention that allow emission of LED light, thus LED light escapes from the carpet to the exterior. However, the accompanying claims do not only relate to carpets during use as light emitter, but also to the carpets per se or to the carpets with the LEDs while switched off.

Primary and Secondary Backing Layer

The primary backing layer has a primary backing layer top face and a primary backing bottom face. The secondary backing layer has a secondary backing layer top face and a secondary backing bottom face. The carpet has a carpet top face and a carpet bottom face. The primary backing layer and the optional secondary backing layer and the optional adhesive layer form a stack or laminate of one or more layer, more precisely, form the carpet, having the carpet top face and a carpet bottom face as "boundaries". The primary backing layer may comprise or be a felt layer (first felt layer); likewise, the optional secondary backing layer may comprise or be a felt layer (second felt layer).

Note that the terms "bottom" and "top" are only used to elucidate in a clear way the different faces of objects such as of the primary backing layer, the adhesive layer (see below), the secondary backing layer and the laminate. The use of the terms "bottom" and "top" does not limit the carpet of the invention as claimed, neither its use, to the configurations schematically depicted in the accompanying drawings. Also carpets on a roll are claimed herein.

The term "primary backing layer" may include a primary backing layer comprising a plurality of layers. Likewise, the term "secondary backing layer" may include a secondary backing layer comprising a plurality of layers.

Especially, the yarns forming tufts of the carpet form a structure having enough openings to transmit light, even though the carpet appears to be opaque to human eyes. For appearance reason, the tufts are preferably provided in such a way that the primary backing layer is substantially not visible, but the light can still penetrate through the tuft structure. Placing a source of light under a primary backing layer which is permeable to light results in that the light from the source of light is emitted from the tufted surface.

Such a tufted carpet has the advantage that it has less size restriction of the light emitting part. For instance, at the location of the light emission, the primary backing has not to be removed.

According to a further embodiment of the invention, the primary backing layer is permeable to light. As used in this description, the terms 'permeable to light' or 'light permeable' mean that all or part of the visible light is permitted to pass through the material, with or without being diffused. This has the advantage that the decrease of the intensity of the light emitted from the light source(s) by the primary backing layer is reduced. For example, more than 5%, or more than 10%, or more than 30% of light intensity coupled out of the light source(s) (i.e. LED(s)) may be transmitted through the primary backing layer (see also below). Such light permeable primary backing layer is especially relevant when the LEDs are arranged between the primary backing layer top face and the carpet bottom face, and especially when the LEDs are arranged between the primary backing layer bottom face and the carpet bottom face, such as in at least one of the optional adhesive layer and/or the optional secondary backing layer.

The term "part of the visible light is permitted to pass" may indicate that all visible light is partly transmitted (i.e. less than 100% is transmitted) but may alternatively or additionally also indicate that some parts of the visible light spectrum is (partly) transmitted and other parts are substantially not transmitted. Layers, especially the adhesive layer (if permeable to light) may be more permeable to some parts of the visible spectrum than to other parts of the visible spectrum, as is known to the person skilled in the art.

According to a further embodiment of the invention, the primary backing layer has apertures which are covered by the tufts. The apertures may increase the intensity of the emitted ("transmitted") light. The freedom of the choice of material for the primary backing layer is now high, because there is no restriction that the primary backing layer material has to be permeable to light. For example a woven textile may be used as primary backing layer. This will have apertures between the yarns in the woven structure.

The primary backing layer and secondary backing layer may in an embodiment be laminated to each other by means known in the art. Therefore, the carpet may be a laminate, herein also indicated as "carpet laminate" or simply "laminate".

Preferably, an adhesive layer is applied to attach the primary layer and secondary layer to each other. Hence, in an embodiment, the light emitting tufted carpet further comprises an adhesive layer having an adhesive layer top face and an adhesive layer bottom face, arranged between the primary backing layer and the secondary backing layer, wherein the adhesive layer is preferably at least partially permeable for the carpet light. Therefore, the invention provides an embodiment of the light emitting tufted carpet comprising the primary backing layer, the adhesive layer, and the secondary backing layer.

Hence, in this embodiment, at least part of the primary backing layer bottom face of the primary backing layer is in contact with at least part of the adhesive layer top face of the adhesive layer, and at least part of the adhesive layer bottom face (opposite of the adhesive layer top face) of the adhesive layer is in contact with at least part of the secondary backing layer top face. In this way, the laminate is provided, here being a "stack" of the primary backing layer, the adhesive layer and the secondary backing layer.

In one embodiment, the carpet does not comprise a secondary backing at all, but only a primary backing layer is provided.

However, the carpet may further optionally comprise more layers than the above indicated primary backing layer, optional adhesive layer, and optional secondary backing layer. Such optional layer(s) may be arranged between the primary backing layer and the adhesive layer, between the primary backing layer and the secondary backing layer (in embodiments wherein the adhesive layer is not present), between the adhesive layer and the secondary backing layer and between the secondary backing layer and the carpet bottom face, etc. Examples of such additional optional layer may be the below indicated scattering layer and reflective layer. More than one optional further layer may be present in the carpet laminate.

As used in this description, the term 'secondary backing layer' includes the backing layer which forms the surface of the carpet opposite from the pile surface. Such a layer is usually referred as a 'secondary backing layer' and is commercially available.

These 'secondary backing layers' have an advantage in that they are well-suited for carpet backing and fit in well with the carpet manufacturing method used in carpet factories. Advantages of using the secondary backing layer may be protection of the LEDs, optional power sources, and conductors) as well as providing strength to the carpet. Hence, preferably the tufted carpet according to the invention comprises the secondary backing layer. The invention is however not restricted to the presence of the secondary backing layer, but further and/or other layers may be present, such as on the side of the secondary backing layer facing away from the adhesive layer (i.e. between the secondary backing layer bottom face and the carpet bottom face), but also elsewhere (see also above).

At least one of the primary backing layer and the optional secondary backing layer comprises a felt layer. If the secondary backing layer is present, at least one of the primary backing layer and the secondary backing layer comprises a felt layer and when only one of these comprises a felt layer, the other layer may comprise polypropylene, nylon or jute. These materials have the advantage that they are of relatively low cost. It is easy to manufacture a light permeable structure with polypropylene or nylon. Also, the fact that these materials are commonly used in existing tufted carpets makes the carpet according to the invention easy to manufacture. It is noted that these backing layers may substantially consist of the above materials. Hence, in an embodiment, the primary backing layer comprises polypropylene, nylon or jute, and the secondary backing layer comprises the felt layer.

According to a further embodiment of the invention the secondary backing layer has an air permeability of at least about 70 $m^3/min/m^2$. Air permeability of the secondary backing layer can be determined according to ASTM D-737, with a pressure differential equal to 0.5 inch (1.27 cm) water. An acceptable value is 250 $ft^3/min/ft^2$ (76.2 $m^3/min/m^2$), but more preferred values are in the range of 350-800 $ft^3/min/ft^2$ (106.7-243.8 $m^3/min/m^2$). Secondary backing layers with an air permeability of below about 70 $ft^3/min/ft^2$ (24.4 $m^3/min/m^2$) are considered to be inadequate for high binder cure rates.

According to a further embodiment of the invention, the secondary backing layer has apertures for air passage. Vaporized binders used for the adhesive layer can pass through the apertures during curing of the carpet. With this embodiment, it may be ensured that the air permeability of the secondary backing layer is sufficiently high.

According to a further embodiment of the invention, the carpet has a delamination strength of at least 44.6 kg/m between the primary backing layer and the secondary backing layer. This requirement is sometimes also indicated as "peel strength" and is normally tested according to ASTM D-3936.

According to a further embodiment of the invention, the LEDs, are integrated in the secondary backing layer, wherein the secondary backing layer is permeable to light for allowing transmission of the light from the light source to the adhesive layer, or the LEDs are provided on the secondary backing layer top face. These two arrangements of the LEDs and the secondary backing layer may ensure that the light from the light source reaches the adhesive layer, to be further transmitted to the primary backing layer top face. The advantage of this approach is that the light source(s) (are) protected within the carpet. The LED(s) may be protected against e.g. abrasion or impact, which could damage e.g. the electronics or damage a water-tight seal around the electronics. On the pile surface side, the light source(s) are protected by the primary backing with tufts, and on the opposite side the LEDs are protected by the secondary backing Protection of the backside is especially important during installation of the carpet. Hence, it is thus also advantageous to use the current invention in a light permeable secondary backing of carpet. The reason for this is that for high quality carpet a certain air permeability of the secondary backing is required to achieve high delamination strength. Especially an air permeability of the secondary backing, determined according to ASTM standard D-737, with a pressure differential equal to 0.5 inch water of at least about 250 $ft^3/min/ft^2$ is preferred.

Adhesive Layer

The adhesive layer comprises an adhesive layer top face, directed to the primary backing layer and an adhesive layer bottom face directed to the secondary backing layer.

Again, the term "adhesive layer" may in an embodiment include an adhesive layer comprising a plurality of adhesive layers (such as a pre-coat layer and adhesive layer) and may in another embodiment include an adhesive layer comprising a plurality (such as a mixture) of adhesives. For instance, the adhesive layer may be present on the backside of the primary backing and adhering the tufts to the primary backing layer and holding the tufts in place as well as adhering the primary backing layer and the secondary backing layer to each other (with for instance the LED(s) within the adhesive layer). Or a first adhesive layer may be present on the backside of the primary backing and adheres the tufts to the primary backing layer and holds the tufts in place, and a second adhesive layer, on top of the first adhesive layer, for adhering the primary backing layer and the secondary backing layer (with for instance the LED(s) within the second adhesive layer). Such adhesive layers, though optionally also being based on different adhesives, are herein indicated as adhesive layer.

Especially in those embodiments wherein the LEDs are at least partially arranged in the adhesive layer or in embodiments wherein LEDs are arranged in the secondary backing layer, it is preferred that the adhesive layer is permeable for carpet light, i.e. (the light escaping from the LED to the exterior of the carpet). Hence, in an embodiment, the adhesive layer is permeable for carpet light.

Therefore, the adhesive layer holding the tufts in place may in an embodiment be used to hold the LEDs in place under the primary backing layer. The LEDs may be positioned between the primary backing layer bottom face of the primary backing layer and the adhesive layer top face of the adhesive layer. Opening(s) (recesses) may be provided in the surface of the adhesive layer top face directed to the primary backing layer, in which the light source can be placed.

According to a preferred embodiment of the invention, the adhesive layer is at least partially permeable to light for allowing transmission of the light from the LEDs to the primary backing layer. This allows that the LEDs may be arranged on the adhesive layer bottom face. In this case, the LEDs may optionally be fixed in place with an additional adhesive means. The LEDs may also be fully encapsulated in the adhesive layer. Alternatively, the LEDs may be positioned under the adhesive layer within a space between the LEDs and the adhesive layer.

In a further embodiment, the adhesive layer further comprises scattering particles, such as $TiO_2$ or calcium carbonate particles. Such particles may improve light outcoupling and/or a homogeneous light distribution/outcoupling over the carpet. Hence, such particles are arranged to scatter part of the carpet light in the adhesive layer.

According to a further embodiment of the invention, the adhesive layer comprises electrically conductive particles. The electrically conductive particles may give the carpet anti-static properties. The electrically conductive particles may be e.g. carbon black, potassium formate (HCOOK), tin-oxide, indium-tin-oxide or silver.

According to a further embodiment of the invention, the adhesive layer comprises anti-oxidants. The anti-oxidants make the adhesive layer more resistant to heat. This is advantageous because LEDs can generate a substantial amount of heat. Also, latex without anti-oxidants may age faster and become yellow after some time, due to which it starts to absorb light, such as possibly the waveguide light.

According to a further embodiment of the invention, the adhesive layer comprises latex. The latex may be light permeable latex. It is noted that the adhesive layer may substantially consist of latex. The latex may be based on terpolymers of styrene, butadiene and an acidic vinyl monomer. When the adhesive layer substantially consists of light permeable latex and comprise substantially no light scattering particles, the light from the light source(s) can leave the carpet efficiently. Thus, preferably no light scattering fillers are used in the adhesive and the adhesive layer is light permeable. Therefore, in an embodiment, the adhesive layer is free from light scattering particles. The phrase "is free from . . . " and similar phrase or terms especially indicate that something "is substantially free from . . . ".

According to a further embodiment of the invention, the adhesive layer comprises acrylics. The acrylics may be light permeable acrylics. It is noted that the adhesive layer may substantially consist of acrylics. An example of acrylics is polyacrylate ester. Advantages of acrylics are hardness, flexibility and resistance against UV. Acrylics are also highly resistant to heat, which makes it an especially suitable material for use in combination with LEDs, which generate a relatively large amount of heat. Latex and acrylics may also be used in combination.

In a preferred embodiment a polyolefin dispersion is used as pre-coat (on for instance the primary layer for subsequent providing the adhesive layer) and/or the adhesive layer itself. A suitable polyolefin dispersion may for instance be HYPOD™ of Dow Chemical. These are propylene- and ethylene-based dispersions that combine the performance of high-molecular-weight thermoplastics and elastomers with the application advantages of a high-solids waterborne dispersion. Polyolefin dispersions can provide benefits to carpet manufacturers by allowing them to apply a thermoplastic backing using conventional coating equipment. For example, using a carpet backing of PVB (poly vinyl butyral), or polypropylene, the problem of UV sensitivity may be solved, while at the same time increasing the UV-light permeability. Hence, another suitable polyolefin dispersion may be a pvb-based dispersion. However, other thermoplastics might have an even higher UV-light permeability LEDs The plurality of LEDs may generate light with substantially similar spectra, but may also generate light with substantially different spectra. Hence, the plurality of LEDs may generate substantially the same colour of light or may generate a plurality of colours. The term "plurality of LEDs" refer to 2 or more LEDs, especially 2-100.000 LEDs. In general, the carpet may comprise 2-10.000 LEDs/m$^2$ carpet, especially 25-2.500 LEDs/m$^2$ carpet.

In a preferred embodiment, the LEDs are Red-Green-Blue (RGB) LEDs. For example, a portion of the LEDs is red LEDs, another portion is green LEDs and yet another portion is blue LEDs. The use of RGB LEDs is advantageous because it allows the colour of the carpet to be changed. For example when white tufts are used in combination with RGB LEDs, it is possible to change the colour of the carpet into any desired colour. For example, by setting the RGB LEDs to the colour green, the tufts of the carpet may for instance look green.

Especially, the LEDs are arranged in recesses. The primary backing layer top face and/or the primary backing layer bottom face may comprises recesses to host the LEDs. When the secondary backing layer is present, alternatively or in addition, the secondary backing layer top face and/or the secondary backing layer bottom face may comprises recesses to host the LEDs. When further the adhesive layer is present, the alternatively or in addition, the adhesive layer top face and/or the adhesive layer bottom face may comprises recesses to host the LEDs.

Others

According to a further embodiment of the invention, at least one of the primary backing layer, the secondary backing layer and the adhesive layer comprises light scattering particles, which are also referred as fillers. Fillers have the advantage of reducing the cost of the carpet, while bulking up the adhesive at the same time. Because the fillers scatter light, this results in that the light from the carpet appears to originate from an area larger than the original emission spot. It is advantageous when a homogeneous light emission is desired. The light scattering particles may be calcium carbonate, or other materials, such as $TiO_2$. The advantage of calcium carbonate is that it is of relatively low cost. Calcium carbonate may be in the form of calcite or chalk. The light scattering particles may also be kaolinite such as china clay fillers. Typically the fillers are used in quantities such as for example 600 g/l, but for many embodiments of the current invention it is preferred that much lower amounts are used in order to increase the light permeability.

According to a further embodiment of the invention, the tufted carpet further comprises a reflecting layer positioned upstream of the LEDs. The reflecting layer can direct the light from the LEDs to the pile surface and increase the intensity of the light emitted from the tufted carpet. For instance, a reflective layer may be arranged between the LEDs and the carpet bottom face. Alternatively, between the secondary backing layer bottom face and the carpet bottom face a reflective layer may be arranged. Assuming the LEDs being arranged substantially within the adhesive layer, between the adhesive layer and the secondary backing layer, a reflective layer may be arranged. Such reflective layer is not necessarily an integral layer, but may also consists of parts, for instance in view of adhesive properties. The carpet bottom face may also be a reflective layer itself. Reflection may be specular or diffuse. Hence, the reflective layer may also be a scattering layer.

The terms "upstream" and "downstream" relate to arrangement of items relative to the propagation of the light (here indicated as carpet light) from the LED, wherein relative to a first position within a beam of light from the LED, a second position in the beam of light closer to the LED is "upstream", and a third position within the beam of light further away from the LED is "downstream".

Hence, the optional adhesive layer, the optional reflective layer or the optional scattering layer may be an integral layer, substantially having the same length and width dimensions as the primary backing layer, but may also consist of parts. For instance, good adhesion between the primary and secondary backing layer may also be achieved wherein there are "layer domains" i.e. parts of the primary and secondary backing layers are adhered to each other by the adhesive layer, and parts are laminated to each other without the adhesive layer in between. The person skilled in the art may optimize the dimensions of the optional adhesive layer, the optional reflective layer or the optional scattering layer in order to obtain the desired results.

The terms "permeable for light", "permeable to light" or "light permeable" relates to the light transmitted by a material, such as a layer. Herein, the term "transmitted" or "transmission" relate to undisturbed transmission (substantially no scattering in the material) and/or disturbed transmission (after scattering, like in translucent materials). Hence, the terms "permeable for light" or "light permeable" may also herein be indicated as "transmission".

The transmission or permeability can be determined by providing light at a specific wavelength with a first intensity to the material and relating the intensity of the integrated light at that wavelength measured after transmission through the material, to the first intensity of the light provided at that specific wavelength to the material (see also E-208 and E-406 of the CRC Handbook of Chemistry and Physics, 69$^{th}$ edition, 1088-1989). The terms "permeable for light" or "light permeable" may indicate that at least 1% of the light is transmitted, more preferably at least 10% of the light, even more preferably at least 30% of the light, by the material or layer. Note that even a low transmission may for this application be allowable, especially when using high-power LEDs. In general, the permeability for light, such as of the primary backing layer, of the secondary backing layer and of the adhesive layer, is especially determined in relation to visible light travelling in the direction to the carpet top layer.

The primary backing layer, especially in embodiments wherein the LEDs are arranged between the primary backing layer and the carpet bottom face, preferably has a light permeability for visible light of at least about 1%, even more preferably at least about 10%, yet even more preferably at least about 30%. Any other downstream material or layer, arranged downstream of the LEDs (i.e. arranged between the LEDs and the primary backing layer top face) has preferably a light permeability of at least about 1%, even more preferably at least about 10%, yet even more preferably at least about 30%.

The terms "blue light" or "blue emission" especially relates to light having a wavelength in the range of about 410-490 nm. The term "green light" especially relates to light having a wavelength in the range of about 500-570 nm. The term "red light" especially relates to light having a wavelength in the range of about 590-650 nm. The term "yellow light" especially relates to light having a wavelength in the range of about 560-590 nm. The term "light" herein, such as in the terms "carpet light" or "light source light" or "LED light", preferably relates to visible light. The term "carpet light" in an embodiment especially relates to light that substantially only consists of visible light. In yet another embodiment, the carpet light may comprise UV light and/or visible light. The term "visible light" especially relates to light having radiation with a wavelength selected from the range of about 400-700 nm.

BRIEF DESCRIPTION OF THE DRAWINGS

Embodiments of the invention will now be described, by way of example only, with reference to the accompanying schematic drawings in which corresponding reference symbols indicate corresponding parts, and in which.

DESCRIPTION OF PREFERRED EMBODIMENTS

Figure 1A:
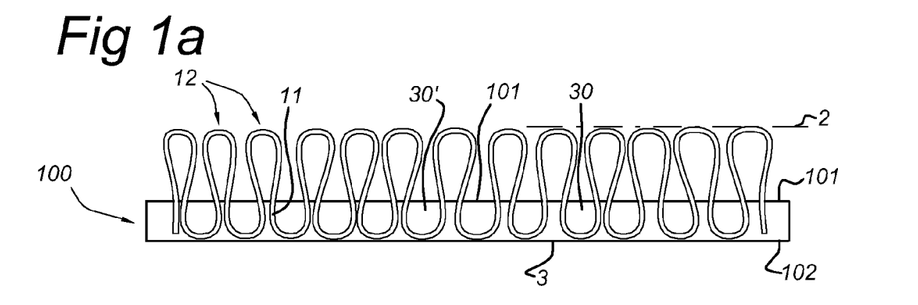
FIGS. 1a-1c schematically depict embodiments of the carpets comprising a primary backing layer (1a), a primary and a secondary backing layer (1b), and a primary backing layer, and adhesive layer and a secondary backing layer (1c), respectively.
Figure 1B:
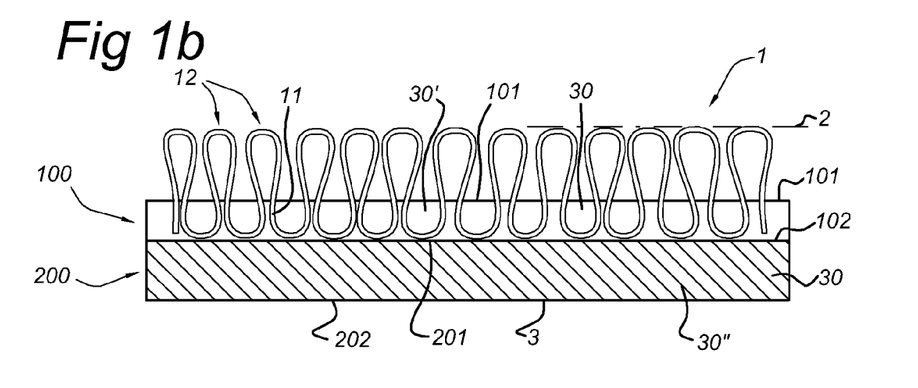
Figure 1C:
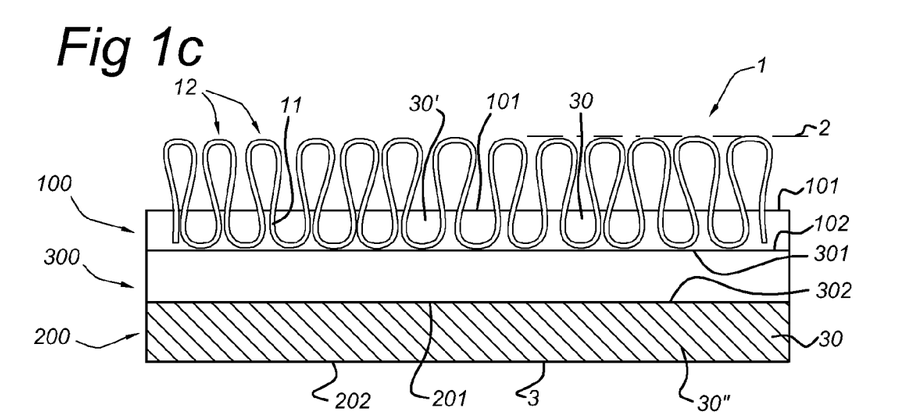

FIGS. 1a-1c schematically depict embodiments of a carpet 1 comprising a primary backing layer 100 (FIG. 1a), a primary backing layer 100 and a secondary backing layer 200 (FIG. 1b), and a primary backing layer 100, an adhesive layer 300 and a secondary backing layer 200, respectively, wherein in the latter the adhesive layer 300 is arranged between the primary backing layer 100 and the secondary backing layer 200. The adhesive layer 300 may also comprise domains (not depicted); i.e. the adhesive layer 300 may be arranged between part(s) of the primary backing layer 100 and the secondary backing layer 200.

The primary backing layer 100 has a primary backing layer top face 101 and a primary backing bottom face 102. The secondary backing layer 200 has a secondary backing layer top face 201 and a secondary backing bottom face 202. The adhesive layer 300 has an adhesive layer top face 301 and an adhesive layer bottom face 301. The carpet has a carpet top face 2, i.e. the carpet surface intended to walk, rest, sit, arrange objects, etc., on, and a carpet bottom face 3. The primary backing layer 100 and the optional secondary backing layer 200 and the optional adhesive layer 300 may form a stack or laminate of one or more layers, more precisely, form the carpet 1, having the carpet top face 2 and a carpet bottom face 3 as "boundaries". The primary backing layer 100 may comprise or be a felt layer 30 (first felt layer 30'); likewise, the secondary backing layer 200 may comprise or be a felt layer 30 (second felt layer 30").

Felt layers in general are indicated with reference 30; to distinguish between a felt layer 30 comprised by the primary backing layer 100 or comprised by the secondary backing layer 200, these felt layers 30 are indicated as first felt layer 30' and second felt layer 30", respectively.

In FIG. 1c, by way of example, the primary backing layer 100 is first felt layer 30' and the secondary backing layer 200 is second felt layer 30"; however, also only one of these backing layers may comprise or be felt layer 30 (and the other layer being of another material.

In FIG. 1a, the carpet bottom face 3 substantially coincides with the primary backing layer bottom face 102. In FIG. 1b, the primary backing layer bottom face 102 is adjacent to the secondary backing layer top face 201, and the carpet bottom face 3 substantially coincides with the secondary backing layer bottom face 202. In FIG. 1c, the primary backing layer bottom face 102 is adjacent to the adhesive top face 301, the adhesive bottom face 302 is adjacent to the secondary backing layer top face 201, and the carpet bottom face 3 substantially coincides with the secondary backing layer bottom face 202.

Note that the terms "bottom" and "top" are only used to elucidate in a clear way the different faces of objects such as of the primary backing layer, the adhesive layer (see below), the secondary backing layer and the laminate. The use of the terms "bottom" and "top" does not limit the carpet of the invention as claimed, neither its use, to the configurations schematically depicted in the accompanying drawings.

The primary backing layer 10 is provided with yarns 11 forming tufts 12, here closed loop tufts, at the primary backing top face 101.

The carpet top face 2 is herein also indicated as "carpet side", or "side facing the user during its use as carpet".

Figure 2A:
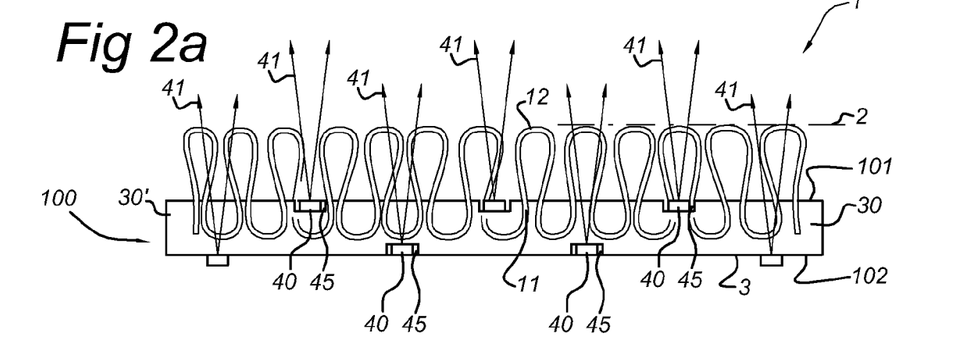
FIGS. 2a-2c schematically depict arrangements of LEDs in embodiments of the carpet of the invention.
Figure 2B:
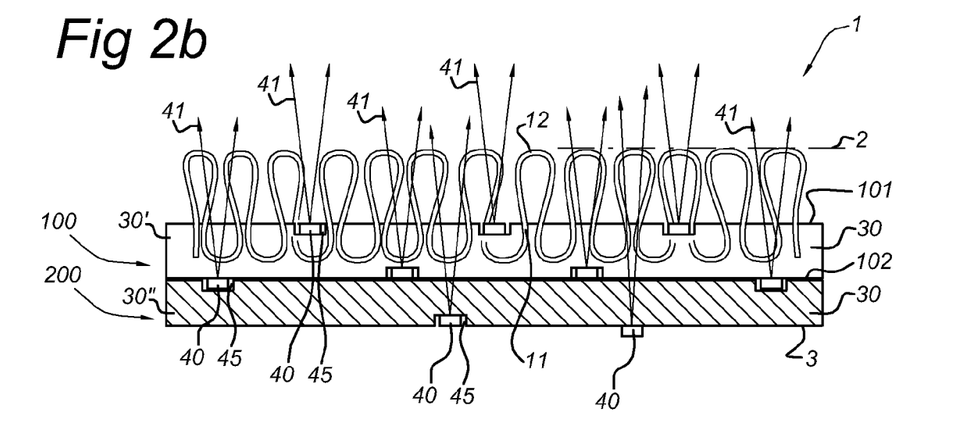
Figure 2C:
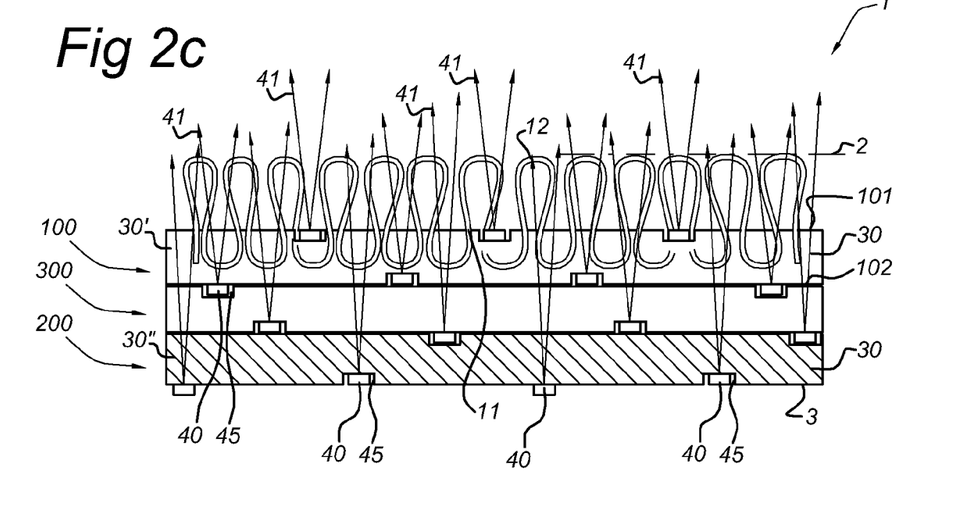

FIGS. 2a-2c schematically depict arrangements of LEDs in embodiments of the carpet of the invention. The schematic drawings are substantially the same as those of FIGS. 1a-1b, with the exception that LEDs 40 are indicated by way of example. LEDs 40 are arranged to generate carpet light 41, escaping from the carpet top face 2. To this end, any part of the carpet 1 downstream from a LED 40 may be designed to be permeable to the carpet light 40.

The drawings are not intended to schematically depict all possible embodiments exhaustively. Most of the LEDs 40 in the schematic drawings are by way of example arranged in a recess 45. The use of a recess 45 has the advantage that the LEDs are more protected from pressure by external sources. LEDs 40 may be arranged in recesses 45 in the primary backing layer top face 101, and/or in recesses 45 in the primary backing bottom face 102, and/or on the primary backing bottom face 102 (FIG. 2a). In addition or alternatively, LEDs 40 may be arranged in recesses 45 in the secondary backing layer top face 201, and/or on the secondary backing layer top face 201, and/or in recesses 45 in the secondary backing bottom face 202 and/or, on the secondary backing bottom face 202 (FIG. 2b). Yet alternatively or in addition, LEDs 40 may be arranged in recesses 45 in the adhesive layer top face 301, and/or on the adhesive layer top face 301, and/or in recesses 45 in the adhesive bottom face 302, and/or on the adhesive bottom face 302 (FIG. 2c). Note that dependent upon the arrangement of the LEDs 40, it is preferred that the primary backing layer 100 and/or the adhesive layer 300 and/or the secondary backing layer 200 are permeable to carpet light 41. For instance, light 41 of LEDs arranged at the secondary backing bottom layer 202 has to travel through at least part of the secondary backing layer 200, through the optional adhesive layer 300 and through the primary backing layer 100.

To illustrate the terms "upstream and "downstream": referring to FIG. 2c, assuming LEDs 40 arranged in the secondary backing top face 201, such LEDs 40 may also have LEDs 40 arranged upstream (i.e. upstream of the LEDs 40 arranged in the secondary backing top face 201), such as LEDs 40 arranged in the secondary backing bottom face 202 (here carpet bottom face 3), and/or may have LEDs 40 arranged upstream (i.e. upstream of the LEDs 40 arranged in the secondary backing top face 201), such as in the primary backing bottom face 102. Likewise, with LEDs 40 arranged in the secondary backing layer 200, the optional adhesive layer 300 (see FIGS. 2b and 2c) is considered arranged downstream of the secondary backing layer 200, and the primary backing layer 100 is also considered arranged downstream of the secondary backing layer 200 (and also considered arranged downstream of the optional adhesive layer 300).

FIGS. 3a-3d schematically depict embodiments of the (first or second) felt layer 30, wherein at least part of the (first and second) conductors are electric wires. Hence, the depicted felt layer 30 describes embodiments of first felt layer 30' and/or second felt layer 30". By way of example and for clarity reasons, only one LED 40 is depicted.

Here, a first conductor 10 and a second conductor 20 are schematically depicted, arranged to provide electric power from a power source 50 to the LED 40. The first conductor 10 and the second conductor 20 are at least partly integrated in the felt layer 30. Here, the conductors 10, 20 comprise electric wires 500, indicated as first conductive electric wire 510 and second conductive electric wired 520, respectively.

Figure 3A:
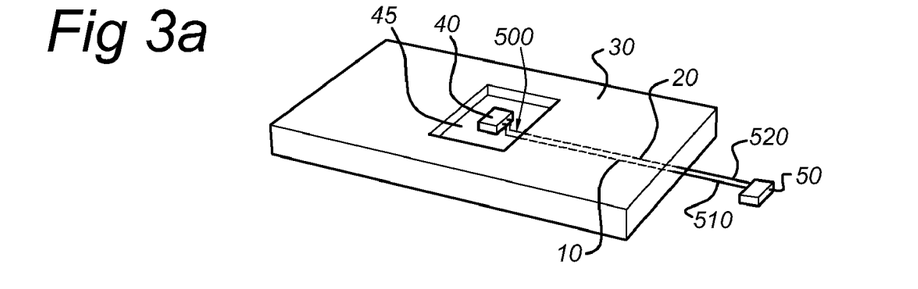
FIGS. 3a-3d schematically depict embodiments of the (first or second) felt, wherein at least part of the (first and second) conductors are electric wires.

In FIG. 3a, the first electric conductor 10 and the second electric conductor 20 are arranged in a plane parallel to a primary backing layer top surface 102 (not depicted, but the felt layer 30 is arranged substantially parallel to the primary backing layer top surface 102; see FIGS. 1a-2c, etc.) in the felt layer 30.

Figure 3B:
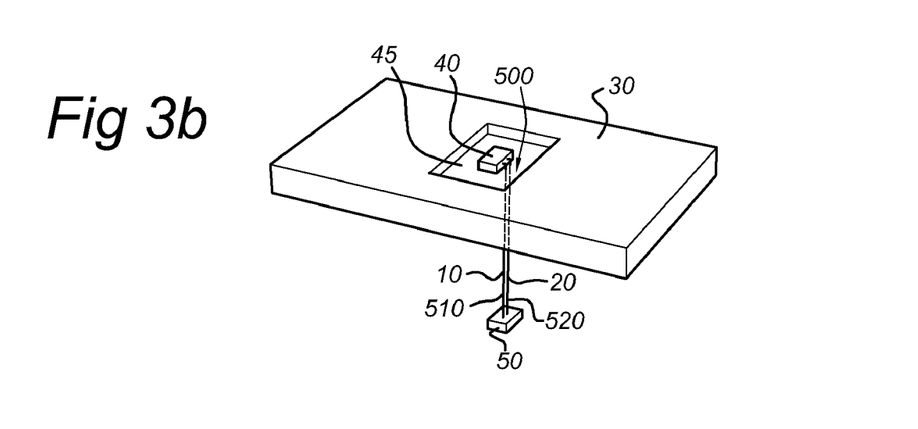

In FIG. 3b however, the first electric conductor 10 and the second electric conductor 20, i.e. here first conductive electric wire 510 and second conductive electric wired 520, penetrate the felt layer 30 (and are thereby at least partly integrated in the felt layer 30) and may protrude from the felt layer 30, for instance to be electrically connected to the power source 50, which may be arranged in a variant at the carpet bottom face 3 and/or may be integrated in a variant in the carpet (not depicted here).

Figure 3C:
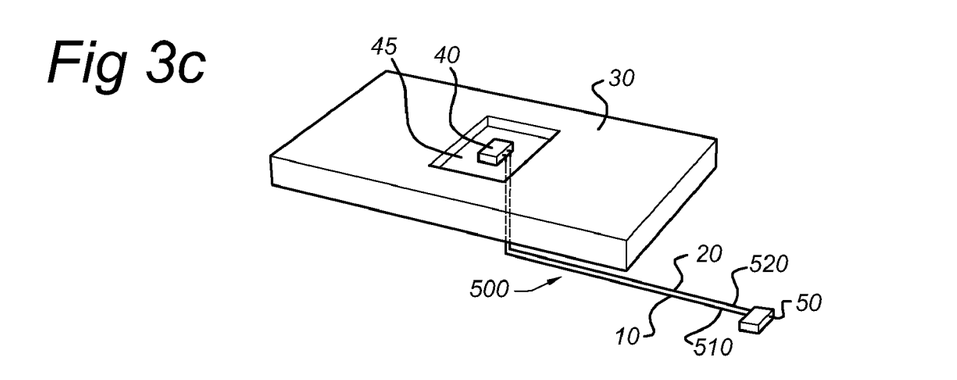

FIG. 3c schematically depicts the same embodiment as schematically depicted in FIG. 3b, but now the power source 50 is arranged external from the carpet 1 (not depicted; but see below).

Figure 3D:
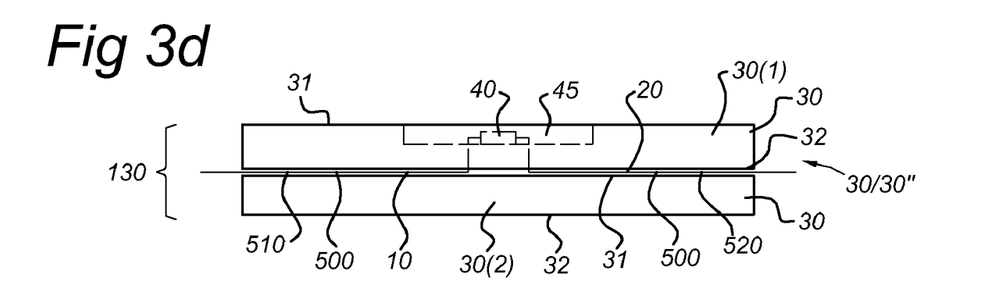

FIG. 3d schematically depicts a felt layer stack 130. Again, this may relate to the first felt layer 30' and the second felt layer 30". The felt layer stack 130 comprises a plurality of felt layers 30. The conductors 10 and/or 20, i.e. here first conductive electric wire 510 and second conductive electric wired 520, may be arranged between two adjacent felt layers 30 of the felt layer stack. Also in this way, the first conductor 10 and the second conductor 20 are at least partly integrated in the felt layer 30 (or more precisely the felt layer stack 130). Any of the felt layers 30 schematically depicted in FIGS. 2a-2c may comprise or may substantially consist of such felt layer stack 130.

Figure 4A:
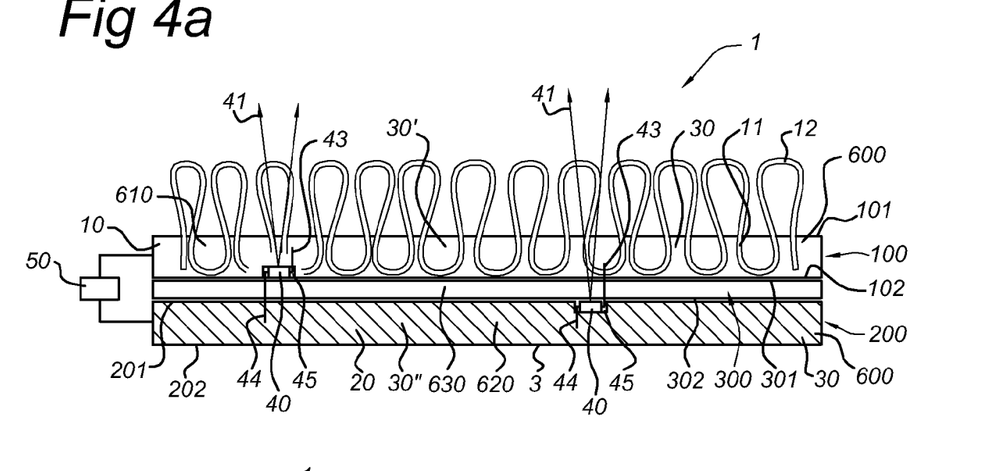
FIGS. 4a-4b schematically depict an embodiment of the carpet, wherein at least part of the (first and second) conductors are electric conductive felt layers.
Figure 4B:
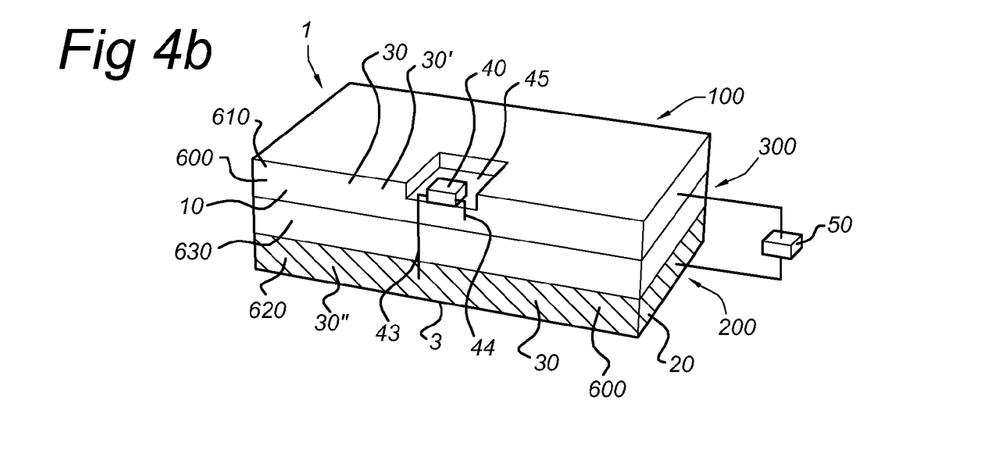

FIGS. 4a-4b schematically depict an embodiment of the carpet 1, wherein at least part of the (first and second) conductors 10,20 are electric conductive felt layers 600.

Electrically conductive fabrics have, in general, been known for some time. Such fabrics have for instance been manufactured by mixing or blending a conductive powder with a polymer melt prior to extrusion of the polymer fibers from which the fabric is made. Such powders may include, for instance, carbon black, silver particles, or even silver- or gold-coated particles. Antistatic fabrics which conduct electricity can also be made by incorporating conductive fibers, e.g., carbon fibers, carbon-filled nylon or polyester fibers, or metal fibers such as stainless steel into yarns used to make such fabrics, or directly woven or knit into the fabric. Electrically or magnetically conductive polymers such as polypyrrole or polyanaline can also be incorporated into textiles so as to provide conductivity. Electrically conductive textile materials made by depositing pre-polymer solutions of polypyrrole or polyanaline onto the textile surface to provide a uniform coating and then treating to complete formation of the polymer have also been disclosed.

Electric conductive felt layers are also known in the art. For instance, such felt may comprise a felt made with yarns that are coated with an electric conductive material, such as for example nickel. Another possibility is to coat the surface of the felt with an electric conductive coating. However, this last possibility is less preferred, because it generally has a low electrical conductivity and it makes the felt more stiff and less open to air and water. Alternatively, a mixture of normal textile yarns and thin metal wires may be used.

The drawings are substantially the same, and merely differ in the fact that FIG. 4b is in perspective, but the tufts 12 are not drawn and FIG. 4a is a cross section and shows tufts. Further, FIGS. 4a and 4b show non-exclusive alternative arrangements of the LEDs.

Here, by way of example, the primary backing layer 10 and the secondary backing layer both comprise felt layer 30, i.e. first felt layer 30' and second felt layer 30". Here however, the felt layers 30 are electric conductive felt layers, indicated with reference 600. Again, to distinguish the electric conductive felt layer 600 comprised by the primary backing layer 10 form the electric conductive felt layer 600 comprised by the secondary backing layer 20, the electric conductive felt layers 600 are indicated as first electric conductive felt layer 610 and as second electric conductive felt layer 620, respectively. Note that FIGS. 4a and 4b depict both backing layers 100,200 comprising the conductive felt layer 600, but as mentioned above, also only one of these backing layers 100,200 may comprise such electric conductive felt layer 600. Further, the presence of the adhesive layer 300 is optional. However, in this embodiment the adhesive layer 300 may further have the function of isolator material 630 to prevent shortcutting of the first electric conductive felt layer 610 and the second electric conductive felt layer 620.

For clarity reasons, the electric contacts of the LEDs 40 are indicated; these contacts have references 43 and 44, respectively. One is in electrical contact with the first conductor 10 (i.e. here first electric conductive felt layer 610) and the other is in electrical contact with the second conductor 20 (i.e. here second electric conductive felt layer 620). These contacts 43,44 may be partly isolated, as will be clear to the person skilled in the art.

Figure 5A:
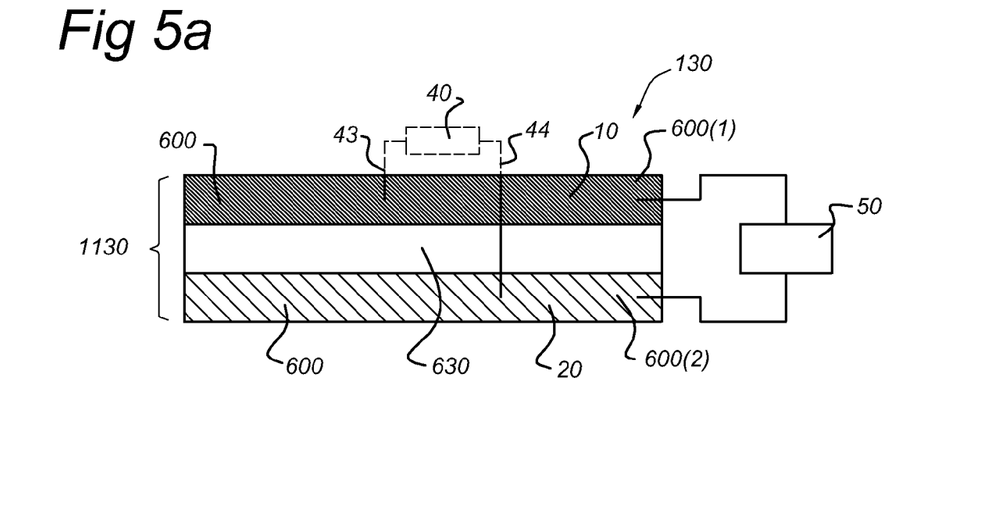
FIGS. 5a-5b schematically depict embodiments of the (first or second) felt, wherein at least part of the (first and second) felts are electric conductive felt layer stacks.
Figure 5B:
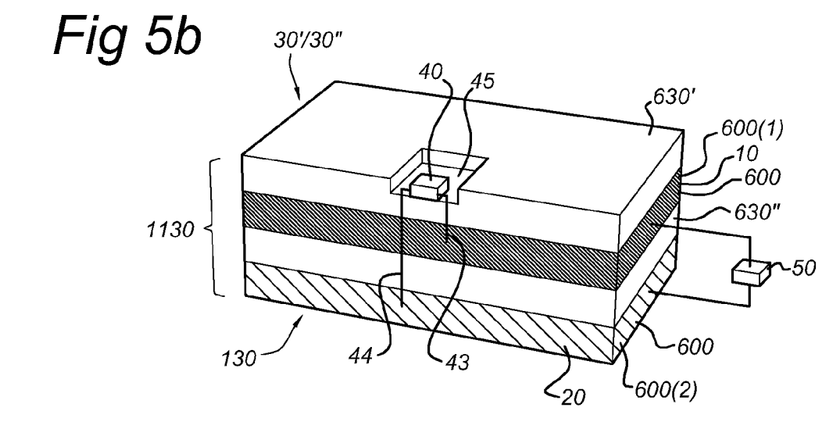

FIGS. 5a-5b schematically depict embodiments of the (first or second) felts 30, wherein at least part of the (first and second) felts 30 are electric conductive felt layer stacks. The electric conductive felt layer stack is indicated with reference 1130. Such electric conductive felt layer stack 1130 is a felt layer stack 130, however having electric conductive properties. By way of example, in FIG. 5a LED 40 is depicted, but since its location for the purpose of this drawing is not relevant, it is dotted. The electric conductive felt layer stack 1130 comprises in essence at least two electrical conductive felt layers 600, one indicated as first electric conductive felt stack layer 600(1), the other indicated as second electric conductive felt stack layer 600(2). Thus, the electric conductive felt layer stack 1130 comprises first electric conductive felt stack layer 600(1) and second electric conductive felt stack layer 600(2), separated from each other by a non-conductive material (i.e. isolator) 630. Again, this may relate to the first felt layer 30' and the second felt layer 30".

FIG. 5a schematically depicts an embodiment of the electric conductive felt layer stack 1130 comprising the first electric conductive felt stack layer 600(1) and second electric conductive felt stack layer 600(2), separated from each other by a non-conductive material (i.e. isolator) 630, here a layer.

FIG. 5b schematically depicts an embodiment of the electric conductive felt layer stack 1130 comprising (a stack of) a first non-conductive material (i.e. isolator) 630, here a layer, indicated with reference 630', the first electric conductive felt stack layer 600(1), a second non-conductive material (i.e. isolator) 630, here a layer, indicated with reference 630", and the second electric conductive felt stack layer 600(2). In FIG. 5b, the LED 40 is arranged in recess 45 in one of the isolator layers 630.

In general, the first electric conductive felt stack layer 600(1) may be used as first conductor 10 or as second conductor 20, and the second electric conductive felt stack layer 600(2) may be used as second conductor 20 or as first conductor 10. However, since combination of embodiments are possible, other configurations are possible.

In FIGS. 5a-5b, for clarity reasons the electric contacts 43,44 of the LEDs 40 are indicated. One is in electrical contact with the first conductor 10 (i.e. here first electric conductive felt stack layer 600(1)) and the other is in electrical contact with the second conductor 20 (i.e. here second electric conductive felt stack layer 600(2)). These contacts 43,44 may be partly isolated, as will be clear to the person skilled in the art.

Figure 6:
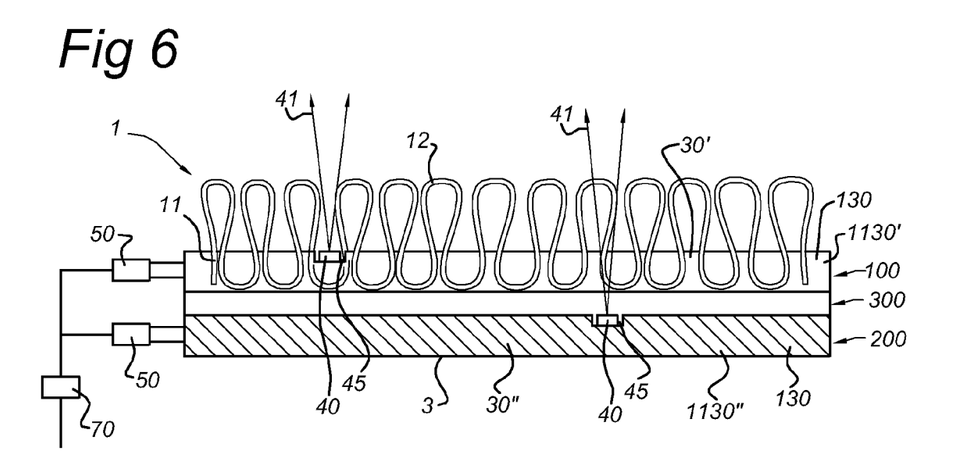
FIG. 6 schematically depicts an embodiment of the carpet, wherein the primary backing layer and the secondary backing layer comprise electric conductive felt layer stacks.

FIG. 6 schematically depicts an embodiment of the carpet, wherein the primary backing layer 100 and the secondary backing layer 200 comprise electric conductive felt layer stacks 1130. Further, a controller 70 is depicted arranged to control the optical properties of the LEDs 40.

Again, to distinguish the electric conductive felt layer stack 1130 comprised by the primary backing layer 100 form the electric conductive felt layer stack 1130 comprised by the secondary backing layer 200, the electric conductive felt layer stacks 1130 are indicated as first electric conductive felt layer stack 1130' and as second electric conductive felt layer stack 1130", respectively. Note that FIG. 6 depict both backing layers 100,200 comprising the electric conductive felt layer stacks 1130, but as mentioned above, also only one of these backing layers 100,200 may comprise such electric conductive felt layer stacks 1130. Further, the presence of the adhesive layer 300 is optional.

Figure 7A:
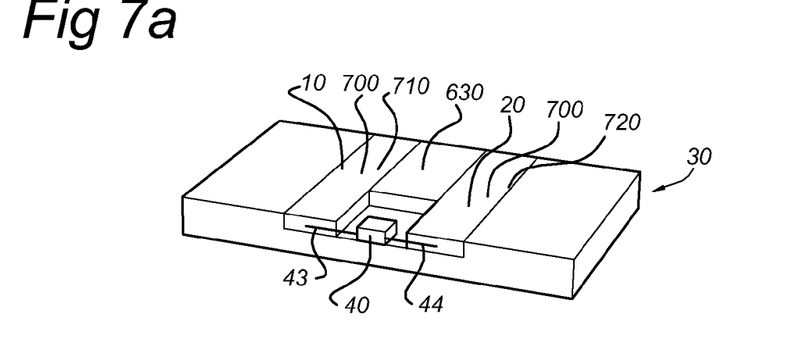
FIGS. 7a-7c schematically depict embodiments of the (first or second) felt, wherein at least part of the (first and second) conductors are electric conductive felt strips.
Figure 7B:
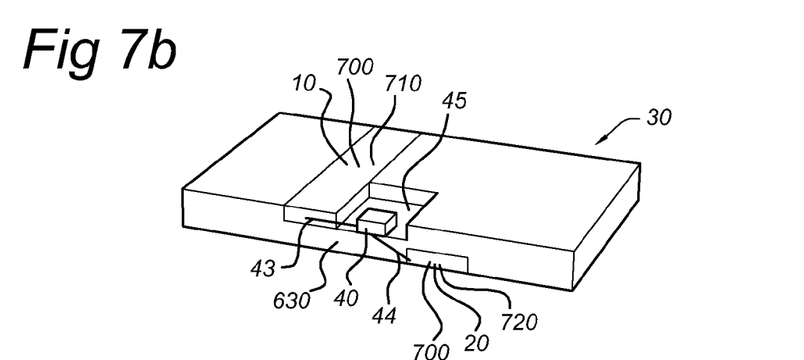
Figure 7C:
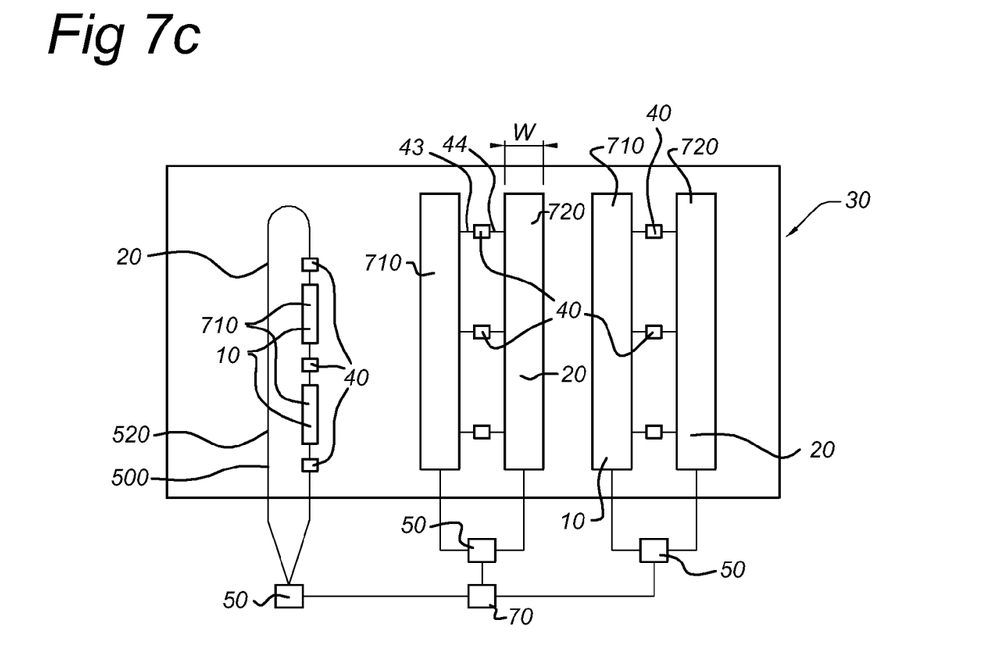

FIGS. 7a-7c schematically depict embodiments of the (first or second) felt 30, wherein at least part of the (first and second) conductors are electric conductive felt strips 700. FIGS. 7a and 7b schematically depict an embodiment of such felt 30 comprising a first electric conductive felt strip 710 and a second electric conductive felt strip 720, separated from each other by a non-conductive material (i.e. isolator) 630. The electric conductive felt strips 700 may be in the same plane, for instance in the same plane as the LED 40, as schematically indicated in FIG. 7a, but may also be in different planes, such as schematically indicated in FIG. 7b. Again, this may relate to the first felt layer 30' and the second felt layer 30".

In general, the first electric conductive felt strip 710 may be used as first conductor 10 or as second conductor 20, and the second electric conductive felt strip 720 may be used as second conductor 20 or as first conductor 10. However, since combination of embodiments are possible, other configurations are possible. For instance, the electric conductive felts 700 may also be in different layers. By way of example (not depicted), the primary backing layer 100 may comprise the first electric conductive felt strip 710 or the second electric conductive felt strip 720 and the secondary backing layer 200 may comprise the second electric conductive felt strip 720 or the first electric conductive felt strip 710. FIG. 7c schematically depicts a top view of a possible embodiment, wherein felt 30 may comprises strips 710,720, but may also comprise a conductive wire (500) as second conductor 20 (as combinations of embodiments are possible). In the left set of LEDs 40, the LEDs 40 are arranged in series, whereas in the right two sets, the LEDs 40 are arranged parallel. The conductive felt strips 700 may have a width w of for instance about 0.5-20 cm, such as about 1-5 cm.

Figure 8:
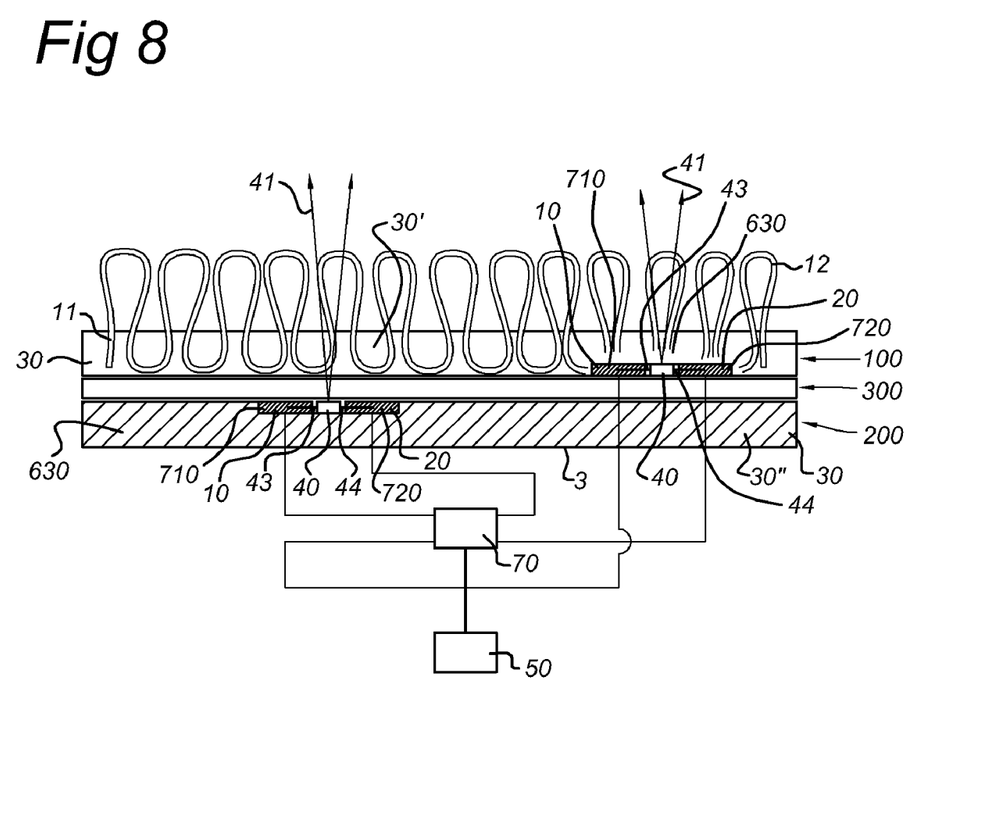
FIG. 8 schematically depicts an embodiment of the carpet, wherein the primary backing layer and the secondary backing layer comprise electric conductive felt strips.

FIG. 8 schematically depicts an embodiment of the carpet 1, wherein the primary backing layer 100 and the secondary backing layer 200 comprise electric conductive felt strips 710,720. Further, controller 70 is depicted arranged to control the optical properties of the LEDs 40. Note that FIG. 8 depict both backing layers 100,200 comprising the electric conductive felt strips 710,270, but as mentioned above, also only one of these backing layers 100,200 may comprise such electric conductive felt strips 700, or one may comprise the first electric conductive felt strip 710 or the second electric conductive felt strip 720 and the other may comprise the second electric conductive felt strip 720 or the first electric conductive felt strip 710. Further, the presence of the adhesive layer 300 is optional.

Further, with respect to the secondary backing layer 20, in an embodiment this secondary backing layer 20 may be based upon an existing product for the secondary backing layer, such as the one known under the name ActionBac®. This is a backing made of a leno weave of slit film and spun olefin yarns. It has a 2.1 ounce per square yard (0.71 gram per square meter) fabric with polypropylene warp tapes and polypropylene multifilament picks in a leno wave with averages of 16 warps per inch (per 2.54 cm) and 5 picks per inch (per 2.54 cm). Such a backing layer imparts dimensional stability with good delamination strength in carpets. This backing layer also has openness well suited for robust curing rates during manufacture. The air permeability of this backing, determined according to ASTM D-737 with a pressure differential equal to 0.5 inch water, exceeds about 750 ft$^3$/min/ft$^2$ (229 m$^3$/min/m$^2$), which is ample for robust binder cure rates. Another such product with a higher count, 18×13, leno wave construction, has average air permeability above about 720 ft$^3$/min/ft$^2$ (219 m$^3$/min/m$^2$). This is also well suited for efficient cure rates. Preferably, the secondary backing layer 20 has a high adhesive compatibility with the material used for the adhesive layer 50, so that the carpet 100 will pass delamination test such as the test described in ASTM D-3936. The delamination resistance-imparting properties should preferably be such that the backing when laminated in the reference carpets described has a delamination strength of at least 2.5 pounds/in (44.6 kg/m). However, preferred values are greater than 3-4 pounds/in (53.6-71.4 kg/m), more preferably at least 5.5 pounds/in (98.2 kg/m) and even more preferably at least 6 pounds/in (107.1 kg/m).

To prevent delamination good bonding is required. Bonding may be improved by having sufficient openness not to impede passage of vaporized binders liquids from the carpet during curing.

Air permeability of the secondary backing can be determined according to ASTM standard D-737, with a pressure differential equal to 0.5 inch water (see also above). An acceptable value is 250 ft$^3$/min/ft$^2$, but more preferred values are in the range of 350-800 ft$^3$/min/ft$^2$. As an example, secondary backings with below about 70 ft$^3$/min/ft$^2$ are considered to be inadequate for high binder cure rates. As an example, ActionBac® is a very suitable secondary backing and exceeds 750 ft³/min/ft².

As can be seen in the figures, part of the secondary backing may be covered with the LEDs. If the base secondary backing has a sufficiently high air permeability this is acceptable. For example, if 50% of the surface is covered, the air permeability is in the worst case reduced to 50% of the normal air permeability. In order to achieve an acceptable air permeability of 250 ft³/min/ft², one should therefore use a secondary backing with an air permeability of greater than 500 ft³/min/ft². As an example, ActionBac® has an air permeability of greater than 700 ft³/min/ft² and therefore may be used for the current invention.

It should be noted that any other existing secondary backing material may be used as basis for the secondary backing layer 20 used in this invention. Other examples are needlefelt backings, rubber backings, PVC backings, polyurethane backings, vinyl backings, cushion backings, nylon backings. The fibres in the needlefelt backings are needled for bonding. It is also noted that a cushion or padding may be integrated in the secondary backing. Another example of a secondary backing material is bitumen. This material is used when extra sturdy carpet is required, such as for example in carpet tiles, or in car mats. In some embodiments bitumen may also be used as adhesive. As mentioned above, preferably such secondary backing layer 20 is comprised in the tufted carpet 100 according to the invention. However, especially, the secondary backing layer comprises the second felt layer 30.

In an embodiment, the first felt layer 30' and/or the second felt layer 30" are heat conductive, and may be arranged to conduct heat away from the LEDs 40. Normally, the heat conduction of polymer materials is below 0.2 W/mK, which is often too low to allow high power LEDs to be used. In this embodiment, the fibres in the felt 30 may have an improved heat conduction, for example by coating them with a heat-conductive material, or by using heat-conductive fibres.

As an example, a felt using fibres with a nickel coating of 35-40 g/m², and a thickness of 1.5 mm has an estimated heat conductivity of 1.3 W/mK, which is roughly one order of magnitude improvement compared to conventional felt (this is calculated using a Ni density of 8.9 g/cm³, yielding a Ni concentration of 22 µm/1.5 mm=1.5%, giving an estimated thermal conductivity of 1.5% of the Ni conductivity of 90.9 W/mK). Electric conductive felts 600 may be electrical conductive per se, but may also be heat conductive, in which case the resulting structure may thus conducts both heat and electricity, which are both useful in combination with LEDs.

The term "substantially" herein, such as in "substantially all emission" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A light emitting tufted carpet comprising:
   primary and secondary backing layers each including a top surface and a felt layer;
   a plurality of LEDs arranged to generate light; and
   a first electric conductor and a second electric conductor for conducting power from a power source to the LEDs,
   wherein one or more of the felt layer of the primary backing layer and the felt layer of the secondary backing layer is one or more of the first and second electric conductors.

2. The light emitting carpet according to claim 1, further comprising an adhesive layer arranged between at least a part of the primary backing layer and the secondary backing layer.

3. The light emitting carpet according to claim 2, wherein one or more of the plurality of LEDs are arranged in a recess of a layer selected from the group consisting of the primary backing layer, the secondary backing layer, and the adhesive layer.

4. The light emitting carpet according to claim 1, wherein one or more of the felt layers comprises a stack.

5. The light emitting carpet according to claim 1, wherein at least part of one or more of the first electric conductor and the second electric conductor are arranged in a plane parallel to at least one top surface.

6. The light emitting carpet according to claim 1, wherein one or more of the first electric conductor and the second electric conductor comprise an electrical wire.

7. The light emitting carpet according to claim 1, wherein one or more of the felt layers comprise conductive felt strips separated by non-conductive material.

8. The light emitting carpet according to claim 7, wherein the felt layer of the primary backing layer is the first electric conductor and the felt layer of the secondary backing layer is the second electric conductor.

9. The light emitting carpet according to claim 7, wherein one or more of the felt layers form a stack comprising a first stack conductor and a second stack layer conductor with an isolator arranged between the first and the second felt stack conductors.

10. The light emitting carpet according to claim 9, wherein the felt layer of the secondary backing layer comprises the stack.

11. The light emitting carpet according to claim 1, wherein one or more of the first electric conductor and the second electric conductor comprise an electrical conductive felt strip.

12. The light emitting carpet according to claim 2, wherein the adhesive layer is permeable to light and wherein the LEDs are arranged in one or more of the adhesive layer and the secondary backing layer.

13. The light emitting carpet according to claim 1, further comprising a controller to individually control the optical properties of two or more subsets of LEDs of the plurality of LEDs.

14. The light emitting carpet according to claim 1, wherein one or more of the felt layers are heat conductive.

15. A light emitting tufted carpet comprising
a primary backing having a felt layer,
a plurality of LEDs arranged to generate light, and
at least one electric conductor integrated in the felt layer to provide power from a power source to the LEDs, wherein the felt layer of the primary backing is the at least one electric conductor.

16. The light emitting tufted carpet according to claim 15, further comprising a secondary backing having a felt layer, wherein the at least one electric conductor is at least two electric conductors at least partially integrated in the felt layer of the primary or the secondary backing.

17. A light emitting tufted carpet comprising:
primary and secondary backing layers each including a top surface and a felt layer;
a plurality of LEDs arranged to generate light; and
a first electric conductor and a second electric conductor for conducting power from a power source to the LEDs, wherein one or more of the first and second electric conductors are at least partially integrated in one or more of the felt layers and the felt layer of the primary backing layer is the first electric conductor and the felt layer of the secondary backing layer is the second electric conductor.

18. A light emitting tufted carpet comprising:
primary and secondary backing layers each including a top surface and a felt layer;
a plurality of LEDs arranged to generate light; and
a first electric conductor and a second electric conductor for conducting power from a power source to the LEDs, wherein one or more of the first and second electric conductors are at least partially integrated in one or more of the felt layers and one or more of the felt layers form a stack comprising a first stack conductor and a second, stack layer conductor with an isolator arranged between the first and the second felt stack conductors.

19. A light emitting tufted carpet comprising:
primary and secondary backing layers each including a top surface and a felt layer;
a plurality of LEDs arranged to generate light;
a first electric conductor and a second electric conductor for conducting power from a power source to the LEDs; and
an adhesive layer arranged between at least a part of the primary backing layer and the secondary backing layer, wherein the adhesive layer is permeable to light and wherein the LEDs are arranged in one or more of the adhesive layer and the secondary backing layer.

* * * * *